(12) United States Patent
Jeon

(10) Patent No.: US 8,636,288 B2
(45) Date of Patent: Jan. 28, 2014

(54) STREET BOARD

(76) Inventor: Jeong Ho Jeon, Incheon (KR)

( * ) Notice: Subject to any disclaimer, the term of this patent is extended or adjusted under 35 U.S.C. 154(b) by 72 days.

(21) Appl. No.: 13/051,858

(22) Filed: Mar. 18, 2011

(65) Prior Publication Data

US 2011/0169234 A1 Jul. 14, 2011

Related U.S. Application Data

(63) Continuation of application No. PCT/KR2009/007557, filed on Dec. 17, 2009.

(30) Foreign Application Priority Data

Dec. 19, 2008 (KR) ........................ 10-2008-0129727

(51) Int. Cl.
*A63C 17/02* (2006.01)
*B62K 21/00* (2006.01)
*B62M 1/00* (2010.01)

(52) U.S. Cl.
USPC .................. 280/11.221; 280/87.041; 280/263

(58) Field of Classification Search
USPC ..................... 280/841, 11.19, 87.041, 87.042, 280/87.043, 87.05, 263, 11.221
See application file for complete search history.

(56) References Cited

U.S. PATENT DOCUMENTS

| | | | | | |
|---|---|---|---|---|---|
| 2,819,907 | A | * | 1/1958 | Thoresen | 280/7.13 |
| 3,035,854 | A | * | 5/1962 | Johnston | 280/221 |
| 3,436,088 | A | * | 4/1969 | Kunselman | 280/842 |
| 4,045,048 | A | * | 8/1977 | Irwin | 280/278 |
| 4,047,732 | A | * | 9/1977 | Williams et al. | 280/287 |
| 4,076,270 | A | * | 2/1978 | Winchell | 280/220 |
| 4,153,263 | A | * | 5/1979 | Yoshimoto | 280/843 |
| 4,241,931 | A | * | 12/1980 | Healy | 280/205 |
| 4,353,566 | A | * | 10/1982 | Mohlenbrock | 280/87.042 |
| 4,515,382 | A | * | 5/1985 | Boese | 280/221 |
| 4,540,192 | A | * | 9/1985 | Shelton | 280/282 |
| 5,039,121 | A | * | 8/1991 | Holter | 280/220 |
| 5,310,202 | A | | 5/1994 | Goodspeed | |
| 5,505,474 | A | * | 4/1996 | Yeh | 280/87.042 |
| 6,499,751 | B1 | * | 12/2002 | Beleski, Jr. | 280/87.041 |
| 6,517,093 | B2 | * | 2/2003 | Feng | 280/87.042 |
| 7,083,178 | B2 | * | 8/2006 | Potter | 280/87.042 |
| 7,195,259 | B2 | | 3/2007 | Gang | |
| 7,681,895 | B2 | * | 3/2010 | Chen | 280/87.041 |
| 8,113,524 | B2 | * | 2/2012 | Karpman | 280/63 |
| 2004/0075230 | A1 | * | 4/2004 | Lin | 280/87.041 |
| 2004/0262872 | A1 | | 12/2004 | Kang | |
| 2007/0001414 | A1 | | 1/2007 | Kang | |
| 2007/0257459 | A1 | | 11/2007 | Gang | |

FOREIGN PATENT DOCUMENTS

| | | |
|---|---|---|
| KR | 10-2007-0084934 | 8/2007 |
| WO | 2006-129918 A1 | 12/2006 |

* cited by examiner

*Primary Examiner* — J. Allen Shriver, II
*Assistant Examiner* — Bridget Avery
(74) *Attorney, Agent, or Firm* — Edwards Wildman Palmer LLP

(57) ABSTRACT

The present invention relates to a street board comprising first and second footrests, a front pivot connection part, and first and second driving links. The first and second driving links are rotatably pivoted to the first and second footrests, respectively and the first and second driving links are rotatably pivoted to each other by the front pivot connection part. The front pivot connection part includes a front angle limit part that can limit an angle formed between the first and second driving links within a predetermined range. The above-described street board is easier to ride compared with conventional street boards.

20 Claims, 13 Drawing Sheets

STREET BOARD

CROSS-REFERENCE TO RELATED APPLICATION

This application is a continuation application of International Application No. PCT/KR2009/007557 filed on Dec. 17, 2009, which claims the benefit of Korean Application No. 10-2008-0129727 filed Dec. 19, 2008, the entire contents of which applications are incorporated herein by reference.

TECHNICAL FIELD

The present invention relates to a board that people can ride on for sports, recreation, and/or entertainment.

BACKGROUND ART

Skateboards and inline skates maintain popularity. Typical skateboards comprise a wide and longitudinally oval plate, on which rider's feet to be placed, a pair of rollers fixed at a front portion of the bottom of the plate, and another pair of rollers fixed at a rear portion of the bottom of the plate. Typical inline skates include boots and a plurality of rollers provided at a predetermined portion of the bottom of each of the boots in a single line.

The rider of a skateboard is able to propel the skateboard by moving his or her foot while putting the other foot on the skateboard. The rider can move in any direction, including U-turn, that he wants to go by moving the center of gravity of his/her body weight. He/she can slow down and/or stop the skateboard by moving the center of gravity of his/her body weight toward a rear side of the skateboard and/or pressing a front or rear portion of the skateboard down by his/her foot so that a braking portion installed at a front or rear portion of the bottom of the skateboard become in contact with the ground.

On the other hand, the rider of an inline skate is able to propel the inline skate by moving his or her feet alternately to kick the ground. He/she can slow down and/or stop the inline skate by contacting a braking part formed at a rear portion of the bottom of the inline skate with the ground.

Traditional skateboards and inline skates, however, have some problems. For example, it is not easy to learn how to ride for beginners, it tends to lead a safety accident, a quite large space is required for riders to ride, and riders may need to obtain a new skateboard or inline skate to fit the size of their foot. There is thus a need for a new street board for people can enjoy easily.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In an aspect, the present invention provides a street board. According to an embodiment, the street board comprises first and second footrests, a front pivot connection part, and first and second driving links. The first footrest includes a first roller part on a portion of the lower surface thereof. The second footrest includes a second roller part on a portion of the lower surface thereof. An end of the first driving link is rotatably pivoted to a side portion of the first footrest, an end of the second driving link is rotatably pivoted to a side portion of the second footrest, and the other end of the first driving link is rotatably pivoted to the other end of the second driving link by the front pivot connection part. The front pivot connection part includes a front angle limit part for limiting an angle formed between the first and second driving links within a predetermined range.

According to another embodiment, the street board may further comprise third and fourth driving links and a rear pivot connection part. An end of the third driving link is rotatably pivoted to a side portion of the first footrest, an end of fourth driving link is rotatably pivoted to a side portion of the second footrest, and the other end of the third driving link is rotatably pivoted to the other end of the fourth driving link by the rear pivot connection part. The rear pivot connection part includes a rear angle limit part for limiting an angle formed between the third and fourth driving links within a predetermined range.

In another aspect, the present invention provides a street board coupled with a steering part. According to an embodiment, the steering part comprises a handles support part, a handle shaft, a horizontal support part, a steering roller, and a steering handle. The handle shaft is inserted into and rotatably supported by the handle support part. An end of the horizontal support part is fixedly connected to the handle support part. The steering roller is rotatably supported by a roller support part fixedly connected to the lower end of the handle shaft. The steering handle is connected to the upper end of the handle shaft. The other end of the horizontal support part is fixedly connected to the front pivot connection part. According to another embodiment, the other end of the horizontal support part is rotatably connected to the front pivot connection part.

The street boards according to the present invention are easier to learn, ride, and enjoy and safer compared with conventional street boards.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, wherein.

DETAILED DESCRIPTION OF THE DISCLOSURE

Figure 1:
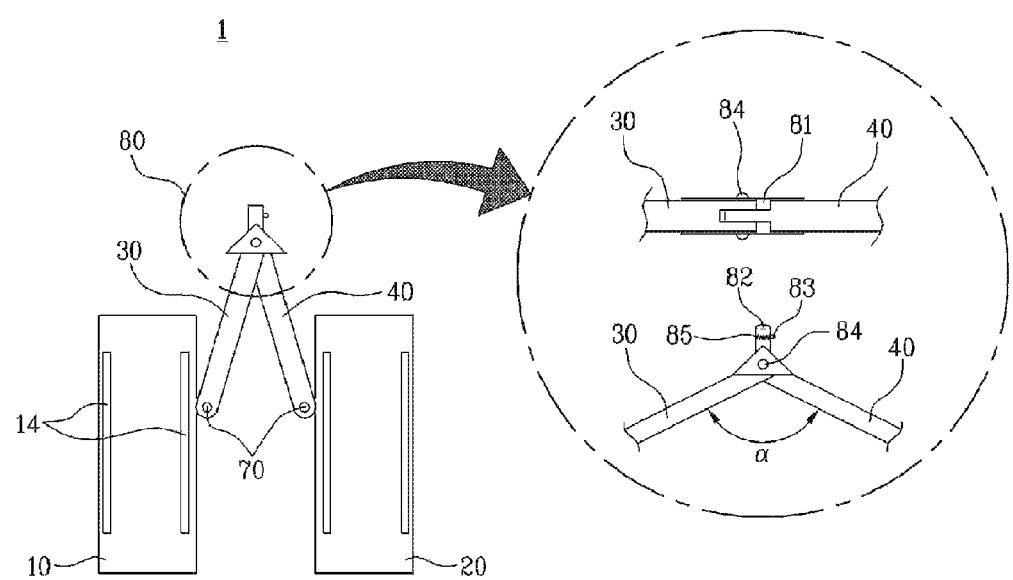
FIG. 1 is a plane view illustrating an example of a board part according to a first embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

As discussed above, the present invention provides a street board including a board part or a board part coupled with a steering part. As shown in FIG. 1, a street board according to a first embodiment of the present invention comprises a board part 1. The board part 1 includes a first footrest 10, a second footrest 20, a first driving link 30, and a second driving link 40. An end of the first driving link 30 is rotatably pivoted to a side portion of the first footrest 10 by a pivot connection part 70. An end of the second driving link 40 is rotatably pivoted to a side portion of the second footrest 20 by a pivot connection part 70. The other end of the first driving link 30 is rotatably pivoted to the other end of the second driving link 40 by a front pivot connection part 80. The front pivot connection part 80 includes a front angle limit part 81 which is connected to the first and second driving links 30 and 40 via a shaft pin 84. Suitably, the front angle limit part 81 may be formed of a plate board in a triangular shape. The front angle limit part 81 functions to keep the angle formed by the first and second driving links 30 and 40 within a certain range ($\alpha$) not greater than 180°, thereby preventing the operation of the street board from being interfered.

Figure 3:
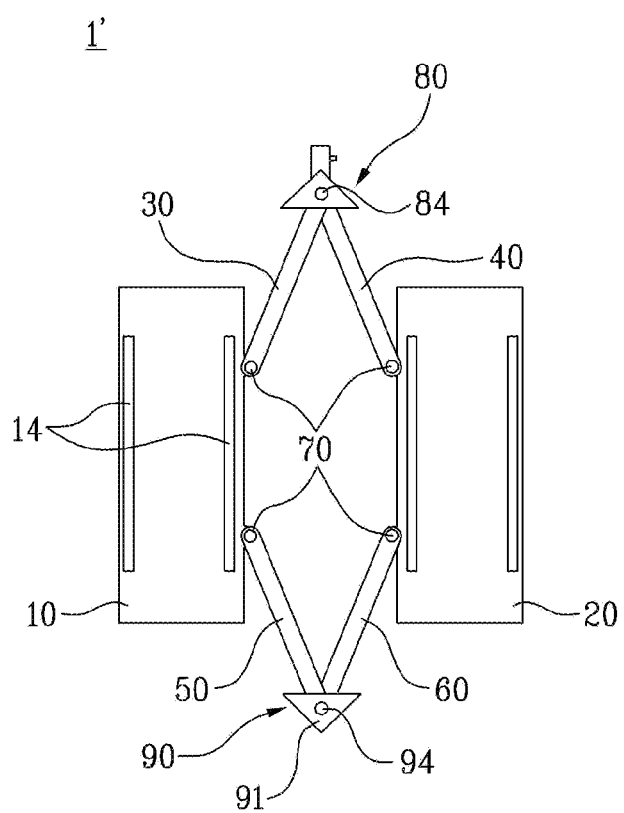
FIG. 3 is a plan view illustrating an example of a board part according to a second embodiment of the present invention.

As shown in FIG. 3, a street board according to a second embodiment of the present invention comprises a board part 1'. In addition to the above-described components of the board part 1, the board part 1' further includes a rear pivot connection part 90, a third driving link 50, and a fourth driving link 60. An end of the third driving link 50 is rotatably pivoted to a side portion of the first footrest 10 by a pivot connection part 70, an end of the fourth driving link 60 is rotatably pivoted to a side portion of the second footrest 20 by a pivot connection part 70, and the other end of the third driving link 50 is rotatably pivoted to the other end of the fourth driving link 60 by the rear pivot connection part 90. The rear pivot connection part 90 includes a rear angle limit part 91 which is connected to the third and fourth driving links 50 and 60 via a shaft pin 94. As the structure and function of the rear pivot connection part 90 are similar to those of the front pivot connection part 80, the detailed description of the rear pivot connection part 90 is omitted.

Figure 8:
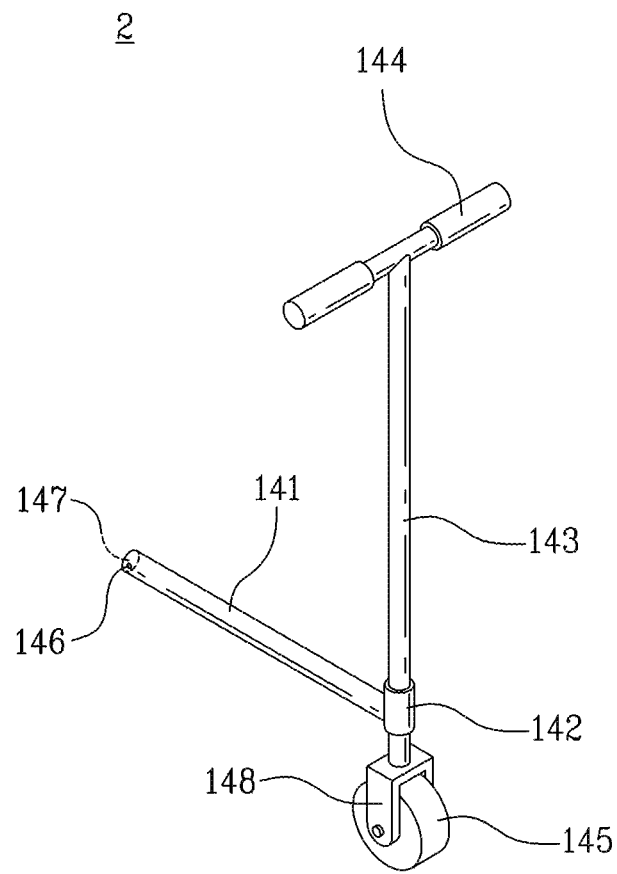
FIG. 8 is a perspective view illustrating an example of a steering part according to the present invention.
Figure 9:
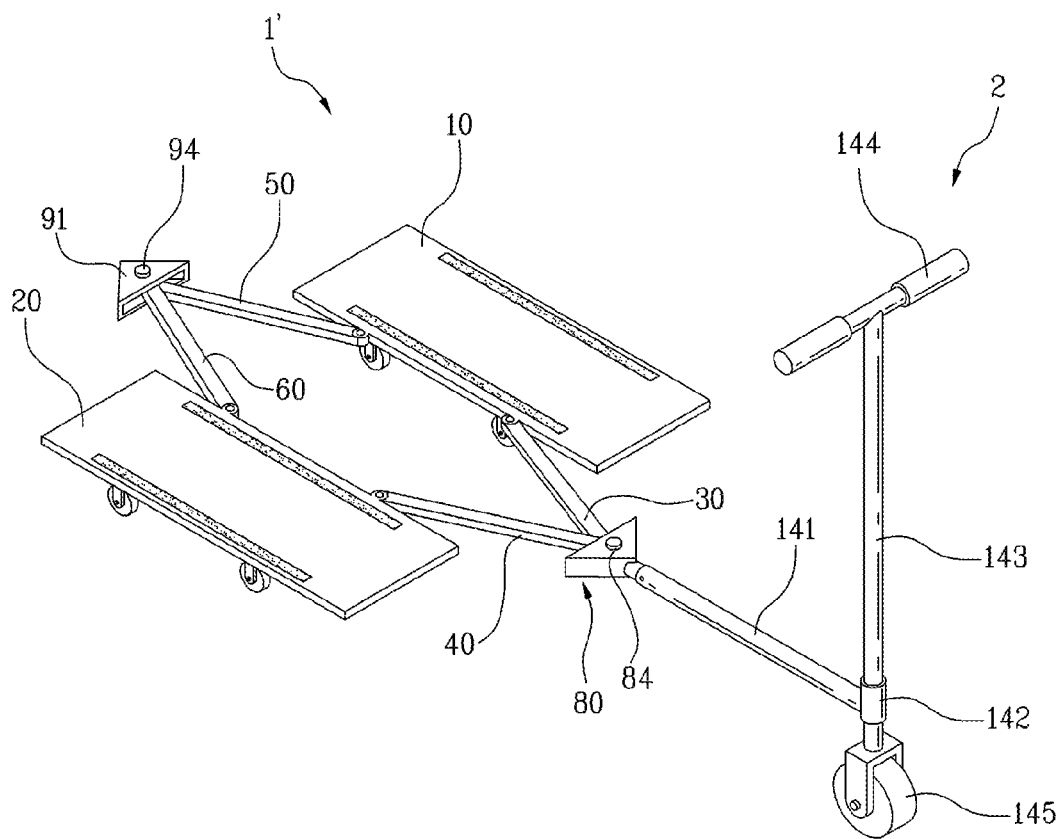
FIG. 9 is an assembled perspective view illustrating the board part of FIG. 3 coupled to the steering part of FIG. 8.

As shown in FIGS. 1 and 3, the front pivot connection part 80 further comprises a steering part connection rod 82, an engaging pin 83, and an elastic member 85. As shown in FIGS. 1, 8, and 9, the steering part connection rod 82 is inserted and fitted into a connection rod inserting part 147 of the steering part 2. The elastic member is formed inside the steering part connection rod 82. The engaging pin 83 is supported by the elastic member 85 and protrudes from the steering part connection rod 82. The engaging pin 83 can be contracted when an elastic force is applied while it can move back to its original state when the elastic force is released, thereby being capable of preventing the steering part connection rod 82 and the connection rod insertion part 147 from escaping from each other.

Preferably, at lease one foot fixing part 14 may be provided on the upper surface(s) of the first footrest 10, the second footrest 20, or both for preventing the rider's feet from slipping on the footrests when in use. For example, as shown in FIGS. 1 and 3, two foot fixing parts 14 may be provided on the left and right sides of the upper surface of the first footrest 10 and another two foot fixing parts 14 may be provided on the left and right sides of the upper surface of the second footrest 20.

Figure 2:
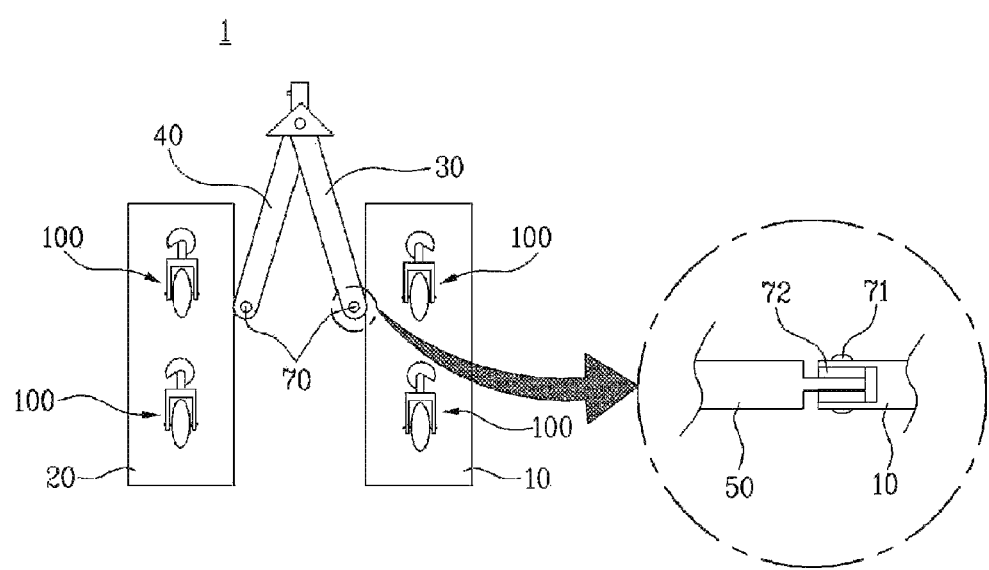
FIG. 2 is a bottom view of the example of a board part of FIG. 1.
Figure 10:
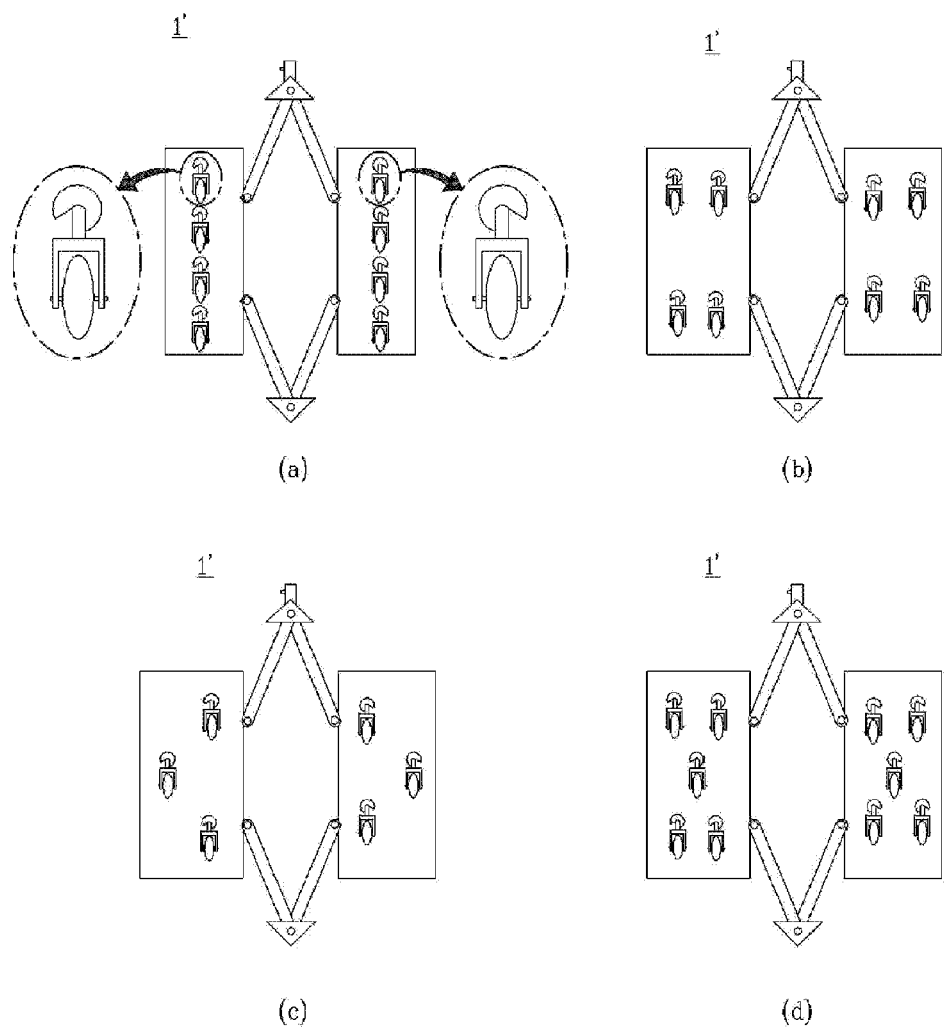
FIG. 10 is a view illustrating examples of the arrangement of roller parts on the lower surface of a board part according to the present invention.

Suitably, at least one roller part 100 may be provided on the lower surface of the first footrest 10 and at least one roller part 100 may be provided on the lower surface of the second footrest 20. For example, as shown in FIG. 2, a first pair of roller parts 100 may be provided on the lower surface of the first footrest 10 and a second pair of roller parts 100 may be provided on the lower surface of the second footrest 20. The first pair of the roller parts 100 of the first footrest 10 and the second pair of the roller parts 100 of the second footrest 20 may suitably be provided symmetrically. Although the number of the roller parts to be provided on each of the lower surfaces of the first and second footrest 10, 20 is not limited to a specific number, a preferable number may be two to six. FIG. 10 shows, as an example, a street board having multiple roller parts symmetrically provided on each of the lower surfaces of the first and second footrests.

If the number of roller parts 100 disposed at one footrest is too high, the overall weight of the street board and the friction with the ground surface may become too high, while being able to absorb the impact that may be caused in the event of riding on a coarse ground surface. On the other hand, if the number is too low, the overall weight of the street board and the friction may be reduced while being able to less absorb such impact. Accordingly, the number of the roller parts 100 can be determined appropriately by considering the above-described and other relevant factors.

The roller parts 100 may be provided on the lower surface of the footrest in various ways. For example, as shown in FIG. 10, the roller parts 100 may be provided in a row, in two rows, or in a triangle shape or in other forms. When the roller parts 100 are arranged in a row, the rider can make straight movement relatively easily while making rotational movement relatively hard. On the contrary, when the roller parts 100 are installed in two rows, the rider can make straight movement relatively hard while making rotational movement relatively easily. Accordingly, the roller parts can be arranged appropriately by considering the above-described and other relevant factors.

As discussed above, an end of each of the driving links 30, 40, 50 and 60 is rotatably pivoted to the first footrest 10 or the second footrest 20 by the pivot connection parts 70. As shown in FIG. 2, each of the pivot connection parts 70 includes a shaft pin 71 and a rubber ring 72. The driving links 30, 40, 50, and 60 each are connected to the first footrest 10 or the second footrest 20 via the shaft pin 71. The rubber ring 72 is disposed between each of the driving links and the first/second footrest 20 and around the shaft pin 71. With the rubber ring 72, the driving links 30, 40, 50 and 60 and the footrests 10, 20 are not only rotatable with respect to each other but also slightly movable in the upward and downward directions thereby efficiently absorbing the impact that may be applied to the pivot connection part 70.

Figure 4:
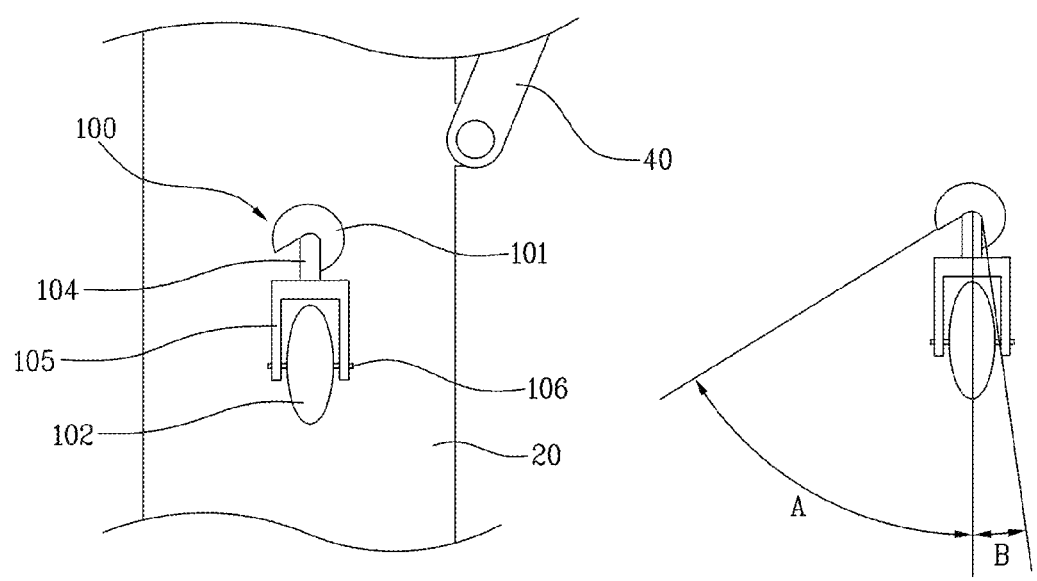
FIG. 4 is a bottom view illustrating an example of a roller part according to the present invention.
Figure 5:
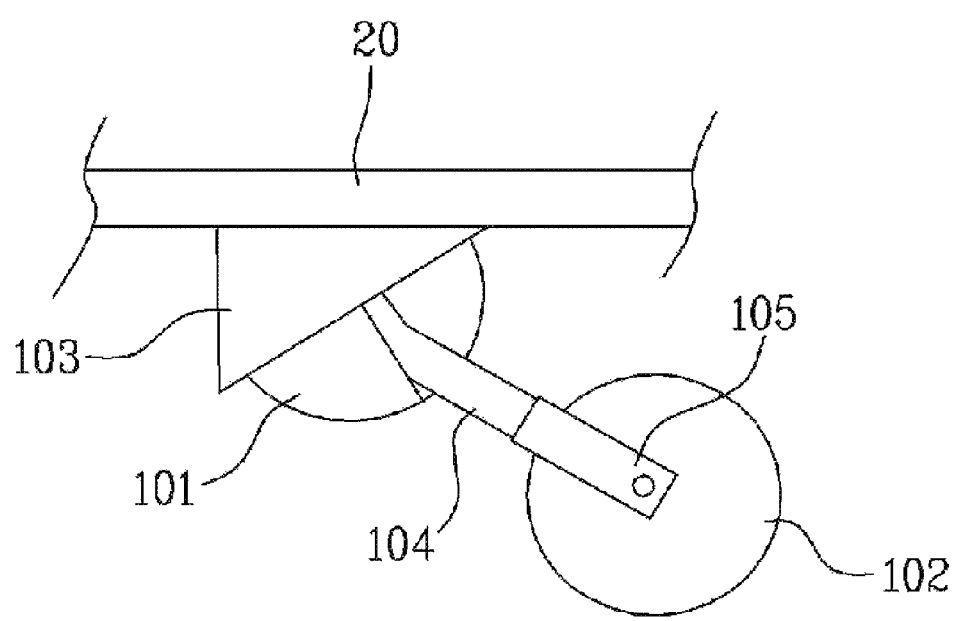
FIG. 5 is a side view illustrating the example of a roller part of FIG. 4.
Figure 6:
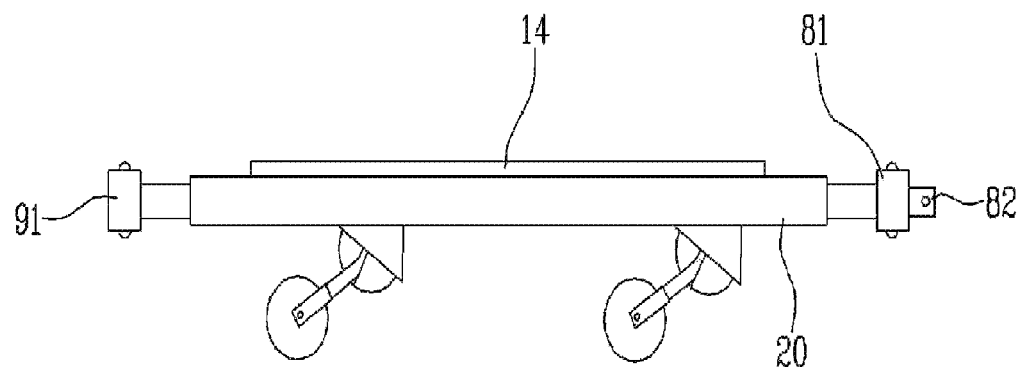
FIG. 6 is a right side view illustrating an example of a board part according to the second embodiment of the present invention.

With reference to FIGS. 4 and 5, the structure of the roller part 100 is described. The roller part 100 comprises a roller rotation angle limit part 101, a roller 102, an orientation angle support part 103, a roller rotary shaft 104, and a roller support part 105. The orientation angle support part 103 is fixed to a portion of the lower surface of the footrest 20. The roller rotation angle limit part 101 is disposed at a portion of the lower side of the orientation angle support part 103 for limiting the rotation angle of the roller 102. The roller rotary shaft 104 is rotatably engaged to the roller rotation angle limit pat 101. The roller support part 105 is formed in the shape of ⊓. A portion of the top side of the roller support part 105 is engaged to the roller rotary shaft 104. An end portion of the left side of the roller support part 105 has a hole, an end portion of the right side of the roller support part 105 has a hole, and the roller 102 has a hole in the center portion thereof. A shaft pin 106 is inserted through the holes so that the roller 102 can be rotatably supported by the roller support part 105.

The footrest 20 and the roller rotary shaft 104 forms a predetermined angle by the orientation angle support part 103. Due to this structure, a propelling force can be generated when a rider propels by using his/her two feet on the footrests. The propelling force is defined as a propelling force 1. On the other hand, another propelling force can be generated when a rider pushes the footrests in left and right directions. The propelling force is defined as a propelling force 2, which will be described below with reference to FIG. 7.

As shown in FIGS. 4 and 5, the roller rotation angle limit part 101 surrounds the roller rotary shaft 104, which helps prevent the roller rotary shaft 104 from rotating beyond a predetermined angle when the footrests 10 and 20 are pushed outwards, thereby obtaining a more efficient propelling operation. The rotary shaft 104 can rotate inwardly (inward rotation) toward the inner sides of the footrests or outwardly (outward rotation) toward the outer sides of the footrests. As shown in FIG. 4, the roller rotation angle limit part 101 functions to limit the rotation angle of the roller rotary shaft 104 to an angle B or smaller in case of inward rotation and to an angle A or smaller in case of outward rotation.

Preferably, the angle B may be set to an angle between 0° and 30°. If the angle B is above 30°, since the rotation of the roller rotary shaft 104 is not controlled when the footrest is pushed outwards. If the angle B is 0°, it is advantageous to the propelling force 2, but since the roller rotary shaft 104 rotates only in the outward direction, it is disadvantageous to the propelling force 1. If the angle B is 30°, since the rotation of the roller rotary shaft 104 is easy, it is advantageous to the propelling force 1, but since the roller rotary shaft 104 rotates 30° inwards with the aid of the repulsive force with respect to the ground when the footrests 10 and 20 are pushed outwards, it is disadvantageous to the propelling force 2. Accordingly, the angle B can be set to an angle closer to 30° in case where the propelling force 1 is needed more than the propelling force 2 and rotational movement is needed more than straight movement. On the other hand, the angle B can be set to an angle closer 0° in case where the propelling force 2 is needed more than the propelling force 1 and straight movement is needed more than rotational movement. As described above, it is possible to select the angle B between 0° and 30° appropriately by considering the purpose of use.

Preferably, the angle A may be set to an angle not greater than 180°. If the angle A is too small, the roller rotary shaft 104 may not smoothly rotate. That is, when it is needed to move the outwardly pushed footrests back in the direction of a rider's body, the rotation of the roller rotary shaft 104 may be limited. On the other hand, if the angle A is larger than 180°, since the direction of the roller 102 may be opposed with respect to the normal direction, inconvenience can be caused when in use.

Figure 7:
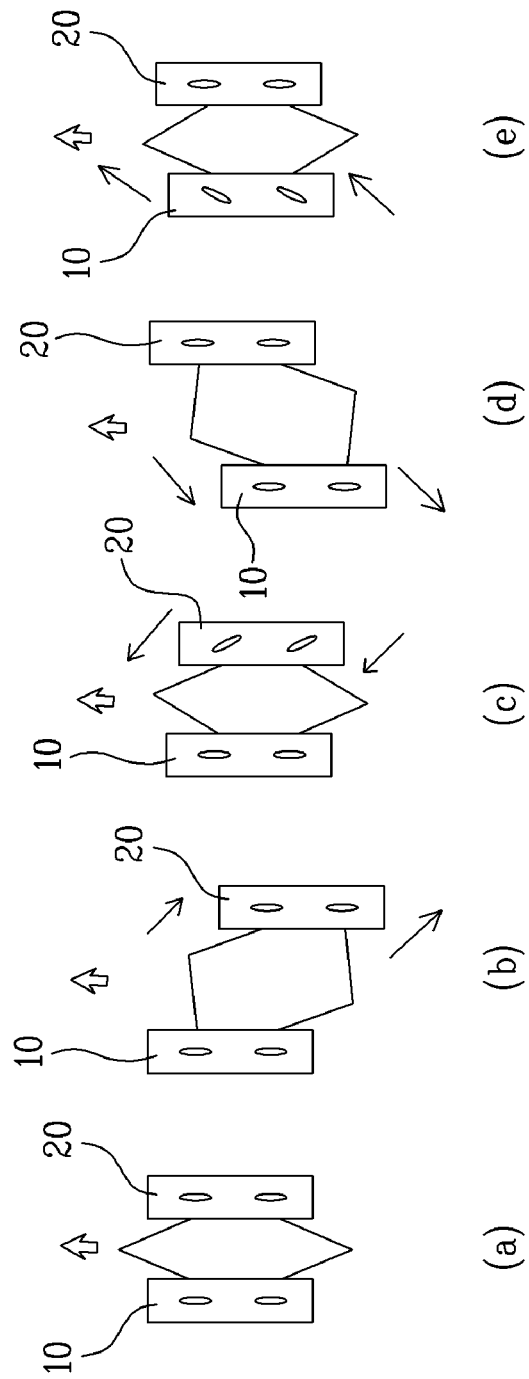
FIG. 7 is a view illustrating operation states of the example of a board part according to the second embodiment of the present invention.

An example of operation of the street board according to the embodiment of the present invention is described with reference to FIG. 7. The oval shapes shown in FIG. 7 represent changes of the angle of the roller 102 due to the rotation of the roller rotary shaft 104 in the course of operation. The arrows represent running directions of the street board. The four driving links 30, 40, 50 and 60 allow the first and second footrests 10 and 20 to be in parallel or substantially parallel with respect to the ground.

FIG. 7(a) shows a standby state before start. In this state, the four rollers 102 are aligned in parallel with respect to the footrests 10 and 20 with the aid of the operation of the orientation angle support part 103. FIG. 7(b) shows a state where the second footrest 20 (right foot) is pushed outwards. The roller rotary shaft 104 provided at a portion of the lower surface of the second footrest 20 keeps the parallel relationship with the second footrest 20 with the aid of the roller rotation angle limit part 101. Therefore, it is possible to drive without loss of power even when the footrest is strongly pushed with the right foot. Without the roller rotation angle limit part 101, the roller rotary shaft 104 would not make inward rotation and would thus not generate a strong driving force when the second footrest 20 is pushed outwardly. FIG. 7(c) shows a state where the footrest 20 (right foot) pushed outwardly is pulled. In the state, the roller rotary shaft 104 under the second footrest 20 rotates outwards with the aid of the angle of the roller rotation angle limit part 101 and the second footrest 20 can be pulled easily. FIG. 7(d) and FIG. 7(e) show the states where the footrest 10 (left foot) is pushed and then pulled. The four rollers 102 all keep being in close contact with the ground while the rider alternately pushes and pulls his/her left and right feet, thereby making it possible to obtain the same driving effects as an inline skate.

The street board can be driven in various directions by changing the angle formed by the rider's two feet. The two footrests 10 and 20 are kept being in parallel or substantially parallel with the ground all the time by means of the four driving links 30, 40, 50 and 60. As discussed above, the street board can be propelled by the propelling force 1 that can be generated by a small movement of the feet and the propelling force 2 that can be generated by pushing the feet outwards like riding an inline skate.

As shown in FIG. 8, the steering part 2 comprises a horizontal support part 141, a handle support part 142, a handle shaft 143, a steering handle 144, and a steering roller 145. The horizontal support part 141 is provided at an end thereof with a connection rod insertion part 147 and an engaging pin insertion part 146. The other end of the horizontal support part 141 is fixedly connected to the handle support part 142. The handle shaft 143 is inserted into and rotatably supported by the handle support part 142. The steering roller 145 is rotatably supported by a roller support part 148. The upper portion of the roller support part 148 is fixedly connected to the lower end of the handle shaft 143. The steering handle 144 is connected to the upper end of the handle shaft 143.

FIG. 9 is an assembled perspective view illustrating the street board 1' engaged to the steering part 2. The street board 1' can be engaged to the steering part 2 by inserting the steering part connection rod 82 into the connection rod insertion part 147 of the steering part 2 while pressing the engaging pin 83, thereby causing the engaging pin 83 to be inserted into the engaging pin insertion part 146 and engaged. The street board 1' can be disengaged from the steering part 2 by performing the process in the reverse order. In case of the street board 1' engaged to the steering part 2, since the steering roller 145 is further provided, it is possible to achieve a more stable operation, the propelling force is created by the street board 1', and the steering operation can be made by operation of the steering handle 144, the footrests 10, 20, or both.

Figure 11:
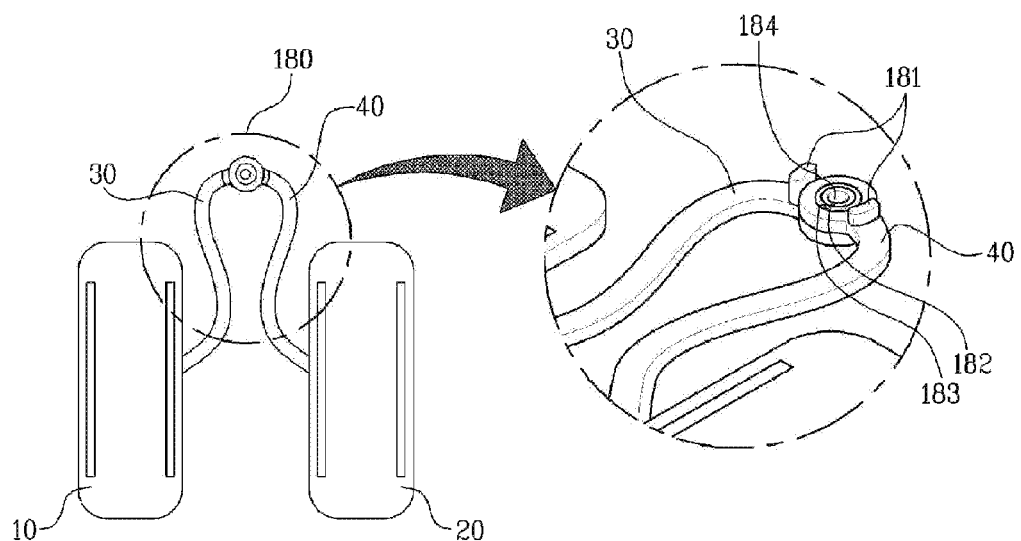
FIG. 11 is a plane view illustrating another example of a board part according to a first embodiment of the present invention.
Figure 12:
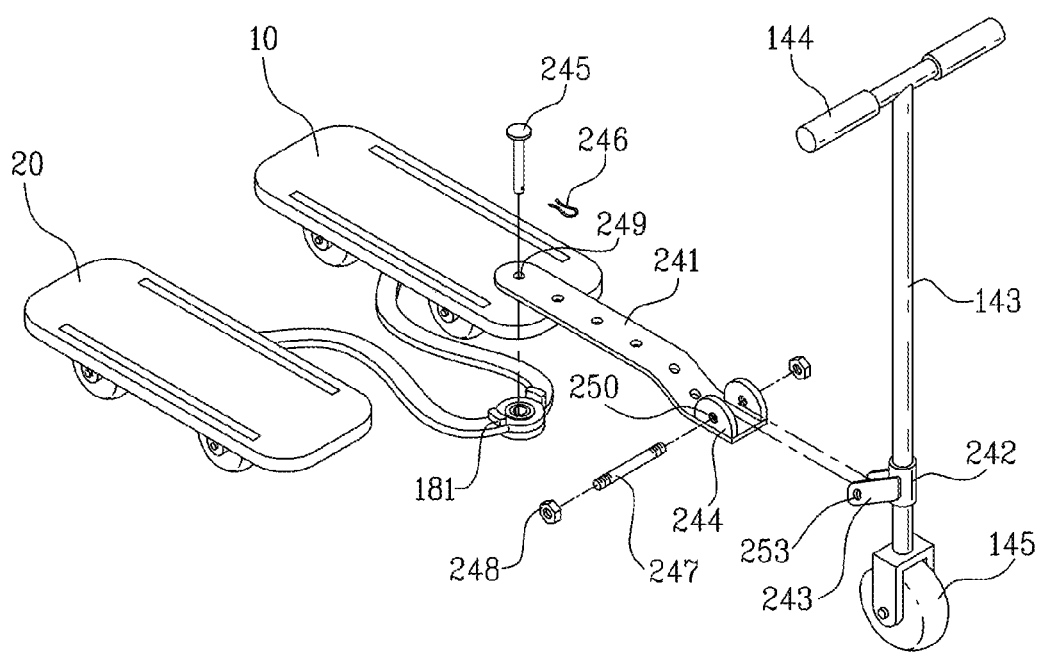
FIG. 12 is a disassembled perspective view illustrating the board part of FIG. 11 coupled to the steering part of FIG. 8.
Figure 13:
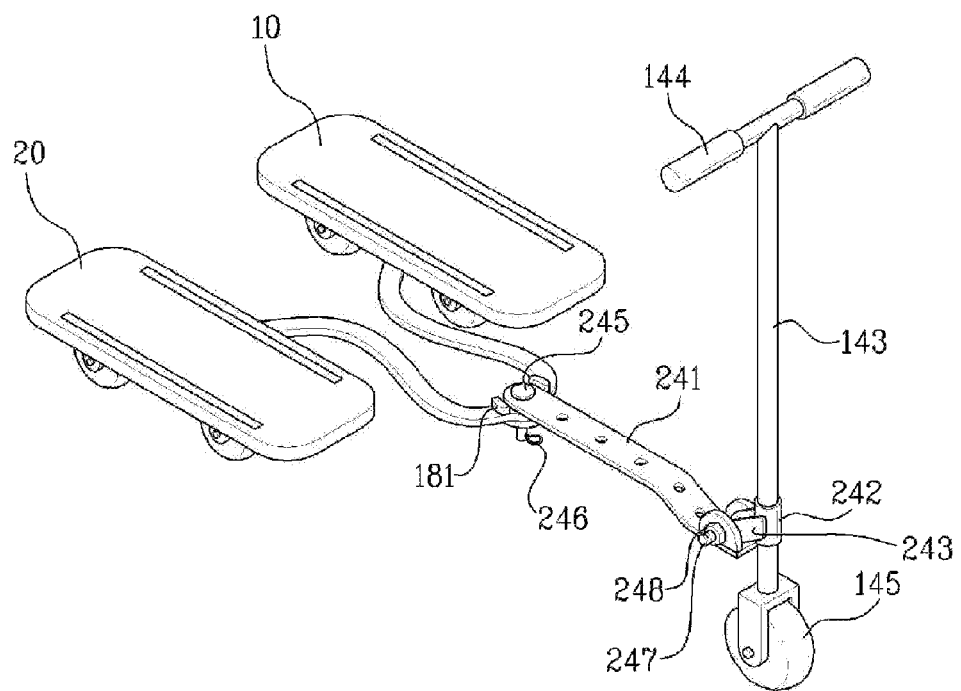
FIG. 13 is an assembled perspective view illustrating the board part of FIG. 11 coupled to the steering part of FIG. 8.

FIGS. 11 to 13 are views illustrating another example of a street board according to the first embodiment of the present invention. In this example, the shapes of the footrests, the driving links, the front pivot connection part, and the horizontal support part, and the connection between the board part and steering part, among others, are different from those illustrated in FIG. 1, as described in detail below.

In particular, as shown in FIG. 11, the footrests 10, 20 have round-shaped corners and the first and second driving links 30, 40 are curved-shaped. Also, the front pivot connection part 180 includes a front angle limit part 181, a pivot shaft 182, a bearing part 183, and a steering part connection hole 184. An end of the first driving link 30 is rotatably pivoted to a side portion of the first footrest 10 and an end of the second driving link 40 is rotatably pivoted to a side portion of the second 10. The other end of the first driving link 30 is connected to a portion of the outer surface of the bearing part 183 and the other end of the second driving link 40 is connected to another portion of the outer surface of the bearing part 183 such that the driving links 30, 40 can rotate by the bearing part 183. The front angle limit part 181 is provided at an end portion of each of the driving links so as to prevent the driving links from being over-rotated. The pivot shaft 182 is provided with a shaft hole at its inner side, and the shaft hole of the pivot shaft 182 is used as a steering part connection hole 184.

As shown in FIGS. 12 and 13, a plurality of through holes 249 are formed in the horizontal support part 241 at predetermined positions. A horizontal support connection part 244 is protruded upwardly from each of the side portions of an end of the horizontal support part 242. The horizontal support connection part 244 is provided with a through hole 250. An end portion of the horizontal support part 241 is engaged with the front pivot connection part 180 by inserting a shaft pin 245 into one of the through holes 249 and the steering part connection hole 184. The shaft pin 245 is supported and fixed by a fixing pin 246. The other end portion of the horizontal support part 241 is engaged with the handle support part 242. The handle support part 242 is provided with a handle support connection part 243 having through holes 253. The engagement between the other end portion of the horizontal support part 241 and the handle support part 242 is made by inserting a connecting rod 247 into the through holes 250 and the through holes 253. Both of the ends of the connecting rod 247 are threaded such that a nut 248 can be coupled with the connecting rod 247.

As described above, the present invention discloses a street board that people can easily learn and enjoy for sports, recreation, and/or entertainment.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:
1. A street board comprising:
a first footrest which has a first roller part on a portion of the lower surface thereof;
a second footrest which has a second roller part on a portion of the lower surface thereof;
a front pivot connection part protruding forwardly from the first and second footrest;
wherein the first roller part and the second roller part includes orientation angle support parts engaged to a lower surface of the first and second footrest respectively, roller rotary shafts formed at a certain angle from the orientation angle support part, and first and second rollers installed on ends of the roller rotary shafts;
a first driving link, an end of the first driving link being rotatably pivoted to a side portion of the first footrest; and
a second driving link, an end of the second driving link being rotatably pivoted to a side portion of the second footrest,
wherein rollers from the first roller part and rollers the second roller part are arranged so that the front pivot connection part is driven in a forward direction,
wherein the other end of the first driving link is linked and rotatably pivoted to the other end of the second driving link by the front pivot connection part,
wherein the other end of the first driving link and the other end of the second driving link make an angle via the front pivot connection part, and
wherein the front pivot connection part includes a front angle limit part for limiting an angle formed between the first and second driving links within a predetermined range.

2. The street board of claim 1, wherein the front pivot connection part comprises a steering part connection rod forwardly protruded from the front angle limit part.

3. The street board of claim 1, wherein the first and second roller parts rotate between 0° and 30° inwardly.

4. The street board of claim 1, further comprising a steering part which is connected with the front pivot connection part.

5. The street board of claim 1, further comprising:
a rear pivot connection part;
a third driving link, an end of the third driving link being rotatably pivoted to a side portion of the first footrest; and
a fourth driving link, an end of fourth driving link being rotatably pivoted to a side portion of the second footrest,
wherein the other end of the third driving link is rotatably pivoted to the other end of the fourth driving link by the rear pivot connection part, and
wherein the rear pivot connection part includes a rear angle limit part for limiting an angle formed between the third and fourth driving links within a predetermined range.

6. The street board of claim 2, wherein the front pivot connection part further comprises:
an elastic member formed inside the steering part connection rod; and
an engaging pin that is supported by the elastic member and protrudes from the steering part connection rod,
wherein the engaging pin can be contracted when an elastic force is applied while it can move to its original state when the elastic force is released.

7. The street board of claim 2, further comprising a steering part which is connected with the steering part connection rod.

8. The street board of claim 6, further comprising a steering part which is connected with the steering part connection rod.

9. The street board of claim 7, wherein the steering part comprises:
a handle support part;
a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the steering part connection rod is inserted into the other end of the horizontal support part.

10. The street board of claim 8, wherein the steering part comprises:

a handle support part;

a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the steering part connection rod is inserted into the other end of the horizontal support part.

11. The street board of claim 4, wherein the steering part comprises:

a handle support part;

a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the other end of the horizontal support part is rotatably connected to the front pivot connection part.

12. The street board of claim 5, wherein the front pivot connection part comprises a steering part connection rod forwardly protruded from the front angle limit part.

13. The street board of claim 5, wherein the first and second roller parts rotate between 0° and 30° inwardly.

14. The street board of claim 5, further comprising a steering part which is connected with the front pivot connection part.

15. The street board of claim 12, wherein the front pivot connection part further comprises:

an elastic member formed inside the steering part connection rod; and an engaging pin that is supported by the elastic member and protrudes from the steering part connection rod, wherein the engaging pin can be contracted when an elastic force is applied while it can move to its original state when the elastic force is released.

16. The street board of claim 12, further comprising a steering part which is connected with the steering part connection rod.

17. The street board of claim 15, further comprising a steering part which is connected with the steering part connection rod.

18. The street board of claim 16, wherein the steering part comprises:

a handle support part;

a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the steering part connection rod is inserted into the other end of the horizontal support part.

19. The street board of claim 17, wherein the steering part comprises:

a handle support part;

a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the steering part connection rod is inserted into the other end of the horizontal support part.

20. The street board of claim 14, wherein the steering part comprises:

a handle support part;

a handle shaft inserted into and rotatably supported by the handle support part;

a horizontal support part, an end of the horizontal support part being fixedly connected to the handle support part;

a steering roller rotatably supported by a roller support part which is fixedly connected to the lower end of the handle shaft; and a steering handle connected to the upper end of the handle shaft, wherein the other end of the horizontal support part is rotatably connected to the front pivot connection part.

* * * * *